US012724284B2

(12) United States Patent
Kusaka et al.

(10) Patent No.: US 12,724,284 B2
(45) Date of Patent: Sep. 1, 2026

(54) OPTICAL COMPUTATION DEVICE AND OPTICAL COMPUTATION METHOD

(71) Applicant: Fujikura Ltd., Tokyo (JP)

(72) Inventors: Hiroyuki Kusaka, Tokyo (JP); Masahiro Kashiwagi, Tokyo (JP)

(73) Assignee: Fujikura Ltd., Tokyo (JP)

( * ) Notice: Subject to any disclaimer, the term of this patent is extended or adjusted under 35 U.S.C. 154(b) by 327 days.

(21) Appl. No.: 18/273,350

(22) PCT Filed: Jan. 14, 2022

(86) PCT No.: PCT/JP2022/001048
§ 371 (c)(1),
(2) Date: Jul. 20, 2023

(87) PCT Pub. No.: WO2022/176459
PCT Pub. Date: Aug. 25, 2022

(65) Prior Publication Data
US 2024/0118555 A1 Apr. 11, 2024

(30) Foreign Application Priority Data
Feb. 19, 2021 (JP) ................................ 2021-025679

(51) Int. Cl.
*G02B 27/42* (2006.01)
*G02B 5/18* (2006.01)
*G06E 3/00* (2006.01)

(52) U.S. Cl.
CPC ....... *G02B 27/4244* (2013.01); *G02B 5/1842* (2013.01); *G02B 27/4294* (2013.01); *G06E 3/001* (2013.01)

(58) Field of Classification Search
None
See application file for complete search history.

(56) References Cited

U.S. PATENT DOCUMENTS 6,522,403 B2 2/2003 Wilson et al.
7,847,225 B2 12/2010 Yokoyama
(Continued)

FOREIGN PATENT DOCUMENTS

CN 106019619 A 10/2016
CN 108780009 A 11/2018
(Continued)

OTHER PUBLICATIONS

Jingxi et al (Machine Vision using Diffractive Spectral Filtering, Science Advances, https://doi.org/10.48550/arXiv.2005.11387, May 2020, pp. 1-16) (Year: 2020).*
(Continued)

*Primary Examiner* — Jyotsna V Dabbi
(74) *Attorney, Agent, or Firm* — Osha Bergman Watanabe & Burton LLP

(57) ABSTRACT

An optical computing device includes a light diffraction element group including light diffraction elements each having an optical computing function, and a light receiver that detects respective intensities of wavelength components contained in signal light outputted from the light diffraction element group. The light diffraction elements are disposed side by side on a light path of the signal light inputted into the light diffraction element group such that the signal light passes sequentially through the light diffraction elements.

6 Claims, 2 Drawing Sheets

(56) References Cited

U.S. PATENT DOCUMENTS

| | | | | |
|---|---|---|---|---|
| 2005/0253071 | A1* | 11/2005 | Ferguson | G01N 21/4795 250/341.1 |
| 2006/0050391 | A1 | 3/2006 | Backlund et al. | |

FOREIGN PATENT DOCUMENTS

| | | | | |
|---|---|---|---|---|
| FI | 20186038 | A1 | 6/2020 | |
| JP | H08-262516 | A | 10/1996 | |
| JP | H10-511475 | A | 11/1998 | |
| WO | 2019/009260 | A1 | 1/2019 | |
| WO | 2019/173383 | A1 | 9/2019 | |
| WO | 2020/153504 | A1 | 7/2020 | |
| WO | WO-2020250618 | A1 * | 12/2020 | G01M 11/00 |

OTHER PUBLICATIONS

Li et al., "Massively parallel universal linear transformations using a wavelength-multiplexed diffractive optical network", Advanced Photonics, Jan./Feb. 2023. vol. 5, No. 1. pp. 016003-1 to 016003-23 (23 pages).

Luo et al., "Design of task-specific optical systems using broadband diffractive neural networks", Light: Science & Applications, Dec. 1, 2019, vol. 8, No. 1 pp. 1-14 (14 pages).

Li et al., "Machine Vision using Diffractive Spectral Encoding", arXiv.org, May 1, 2020, pp. 1-16 (17 pages).

Lin et al., "All-optical machine learning using diffractive deep neural networks," Science, Sep. 7, 2018, vol. 361, No. 6406, pp. 1004-1008 (6 pages).

Yan et. at., "Fourier-space Diffractive Deep Neural Network", Physical Review Letters, Jul. 9, 2019, vol. 123, No. 2, p. 023901-1 to 023901-6 (6 pages).

Written Opinion issued in International Application No. PCT/JP2022/001048, mailed Mar. 15, 2022 (9 pages).

International Search Report issued in corresponding International Application No. PCT/JP2022/001048 mailed Mar. 15, 2022 (3 pages).

* cited by examiner

OPTICAL COMPUTATION DEVICE AND OPTICAL COMPUTATION METHOD

BACKGROUND

Technical Field

The present invention relates to an optical computing device and an optical computing method each of which performs optical computing with use of a light diffraction element.

Description of the Related Art

A light diffraction element has been known which includes a plurality of microcells and which is designed to optically carry out predetermined computing by causing signal light beams that have passed through the microcells to mutually interfere with each other. Optical computing carried out with use of a light diffraction element has an advantage of achieving higher speed and lower electric power consumption as compared with electrical computing carried out with use of a processor. Patent Literature 1 discloses an optical neural network having an input layer, an intermediate layer, and an output layer. The optical filter described above can be used as, for example, an intermediate layer of such an optical neural network.

PATENT LITERATURE

Patent Literature 1: U.S. Pat. No. 7,847,225

Such a conventional optical computing device have been designed such that, when signal light having a specific wavelength is inputted into a light diffraction element of the optical computing device, the light diffraction element performs desired optical computing. Among a plurality of wavelength components (discrete spectrum) or countless wavelength components (continuous spectrum) contained in signal light, only a wavelength component having a specific wavelength is used for optical computing, and other wavelength components are wasted, without being used for the optical computing.

SUMMARY

One or more embodiments provide an optical computing device and an optical computing method each of which can use, for optical computing, a plurality of wavelength components contained in signal light.

An optical computing device in accordance with one or more embodiments includes: a light diffraction element group including at least one light diffraction element having an optical computing function; and a light receiving section (example of a light receiver) configured to individually detect respective intensities of a plurality of wavelength components contained in signal light outputted from the light diffraction element group.

An optical computing method according to one or more embodiments is an optical computing method that uses a light diffraction element group including at least one light diffraction element having an optical computing function, the method including the step of: individually detecting respective intensities of a plurality of wavelength components contained in signal light outputted from the light diffraction element group.

According to one or more embodiments, it is possible to achieve an optical computing device or optical computing method each of which can use, for optical computing, a plurality of wavelength components contained in signal light.

DESCRIPTION OF THE EMBODIMENTS

Configuration of Optical Computing Device

Figure 1:
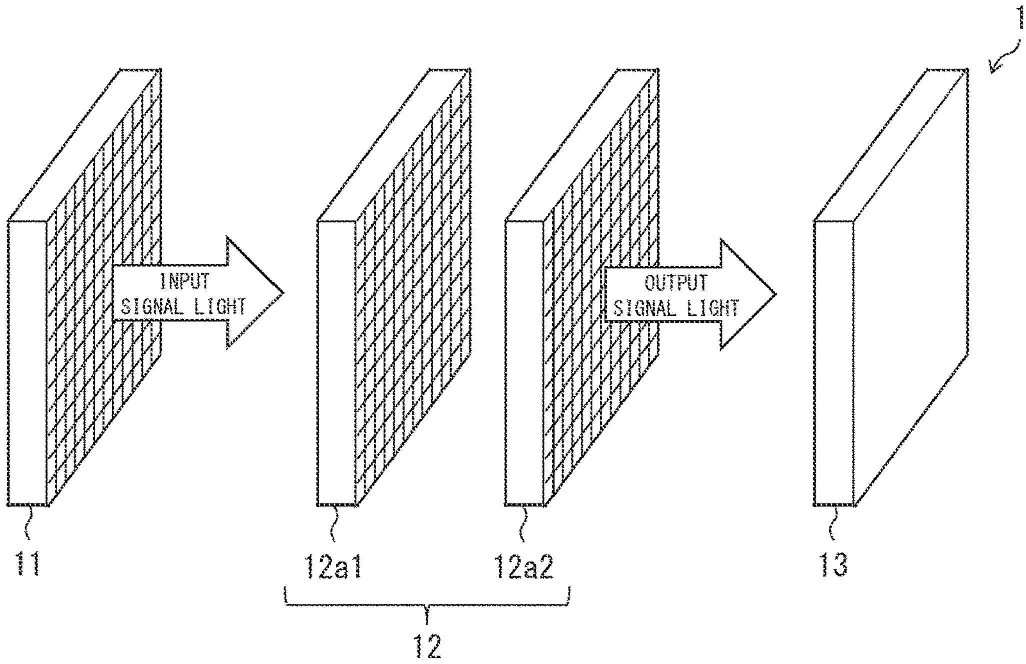
FIG. 1 is a perspective view illustrating a configuration of an optical computing device in accordance with one or more embodiments.

With reference to FIG. 1, the following will describe an optical computing device 1 in accordance with one or more embodiments. FIG. 1 is a perspective view illustrating a configuration of the optical computing device 1.

As illustrated in FIG. 1, the optical computing device 1 includes a light emitting section (example of a light emitter) 11, a light diffraction element group 12, and a light receiving section 13.

The light emitting section 11 is configured to generate signal light that is polychromatic light. Here, the term "signal light" refers to light having a two-dimensional intensity distribution depending on a signal. Further, the expression "signal light that is polychromatic light" refers to signal light which contains a plurality of wavelength components. In one or more embodiments, used as the light emitting section 11 is a display configured to generate signal light containing a plurality of wavelength components belonging to a visible light band. As one example, used as the light emitting section 11 is a display configured to generate signal light containing a blue component, a green component, and a red component. Hereinafter, the signal light outputted from the light emitting section 11 is also referred to as "input signal light".

The light diffraction element group 12 is arranged on a light path of the input signal light. The light diffraction element group 12 is a set of n light diffraction elements **12*a*1 to 12*an*. Here, n is a natural number that is not less than 1. Each light diffraction element 12*ai* is configured to perform predetermined optical computing. In other words, each light diffraction element 12*ai* is configured to convert a two-dimensional intensity distribution of signal light in accordance with a predetermined conversion rule. Here, i is a natural number that is not less than 1 and not more than n. In one or more embodiments, a set of two light diffraction elements 12*a*1 and 12*a*2 is used as the light diffraction element group 12. The configuration of the light diffraction element 12*ai*** will be described later with reference to another drawing.

In the light diffraction element group 12, the light diffraction elements **12*a*1 to 12*an* are arranged side by side in a straight line on the light path of the input signal light. Thus, the input signal light passes through a first light diffraction element 12*a*1, a second light diffraction element 12*a*2, . . . , and an n-th light diffraction element 12*an* in this order. Therefore, in the light diffraction element group 12, the input signal light is subjected to first optical computing performed by the first light diffraction element 12*a*1, second optical computing performed by the second light diffraction element 12*a*2, and n-th optical computing performed by the n-th light diffraction element 12*an*, in this order. The intensity distribution of the signal light outputted from the light diffraction element group 12 shows computation results of these computing processes. Hereinafter, the signal light outputted from the light diffraction element group 12** is also referred to as "output signal light".

The light receiving section 13 is arranged on a light path of the output signal light. The light receiving section 13 is configured to individually detect respective two-dimensional intensity distributions of a plurality of wavelength components contained in output signal light. In one or more embodiments, used as the light receiving section 13 is a multispectral camera which individually detects respective two-dimensional intensity distributions of a plurality of wavelength components belonging to a visible light band. As one example, used as the light receiving section 13 is a multispectral camera configured to individually detect respective two-dimensional intensity distributions of blue, green, and red components. Note that the multispectral camera refers to a camera that is capable of individually detecting two-dimensional intensity distributions in ten or more wavelength bands. Further, in a case where wavelength components more than the wavelength components contained in the output signal light are required to be detected, a hyperspectral camera may be used as the light receiving section 13. Here, the hyperspectral camera refers to a camera that can individually detect two-dimensional intensity distributions in 100 or more wavelength bands.

The wavelength components contained in input signal light may (1) have the same two-dimensional intensity distribution, that is, indicate the same signal or (2) have different two-dimensional intensity distributions, that is, indicate different signals.

In a case where the input signal light and the output signal light each contain m wavelength components, and two-dimensional intensity distributions of the m wavelength components contained in the input signal light indicate the same input signal x, the optical computing device 1 can provide m computation results f1(x), f2(x), . . . , and fm(x) with respect to the input signal x. As one example, in a case where the two-dimensional intensity distributions of the m wavelength components contained in the input signal light indicate the same input image x, it is possible to provide, as classification results of a subject contained in the input images x, m classification results f1(x), f2(x), . . . , fm(x). Thus, the optical computing device 1 can provide a more accurate or more detailed computation result than that provided through single-wavelength optical computing. In a case where a more accurate computation result f(x) is required, for example, an average of the m computation results f1(x), f2(x), . . . , and fm(x) may be calculated. Further, in a case where a more detailed computation result f(x) is required, for example, a direct product of the m computation results f1(x), f2(x), . . . , and fm(x) need only be calculated.

In contrast, in a case where the input signal light and the output signal light each contain m wavelength components, and two-dimensional intensity distributions of the m wavelength components contained in the input signal light indicate different input signals x1, x2, . . . , and xm, the optical computing device 1 can provide computation results f1(x1), f2(x2), . . . , and fm(xm) with respect to the respective m input signals x1, x2, . . . , and xm. As one example, in a case where the two-dimensional intensity distributions of the m wavelength components contained in the input signal light indicate different input images x1, x2, . . . , and xm, it is possible to provide, as classification results of subjects contained in the input images x1, x2, . . . , xm, m classification results f1(x1), f2(x2), . . . , and fm(xm). Thus, the optical computing device 1 can provide a greater variety of computation results than the ones provided through the single-wavelength optical computing.

Configuration of Light Diffraction Element

Figure 2:
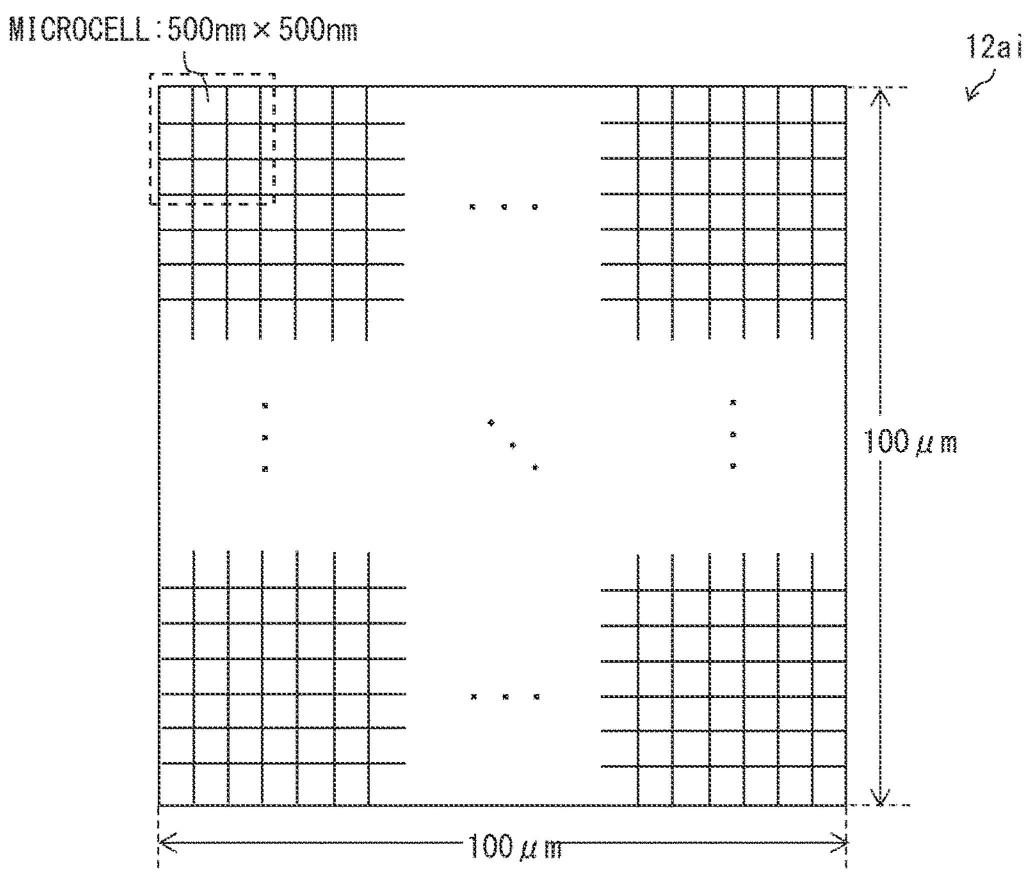
FIG. 2 is a plan view illustrating a configuration of a light diffraction element included in the optical computing device illustrated in FIG. 1.
Figure 3:
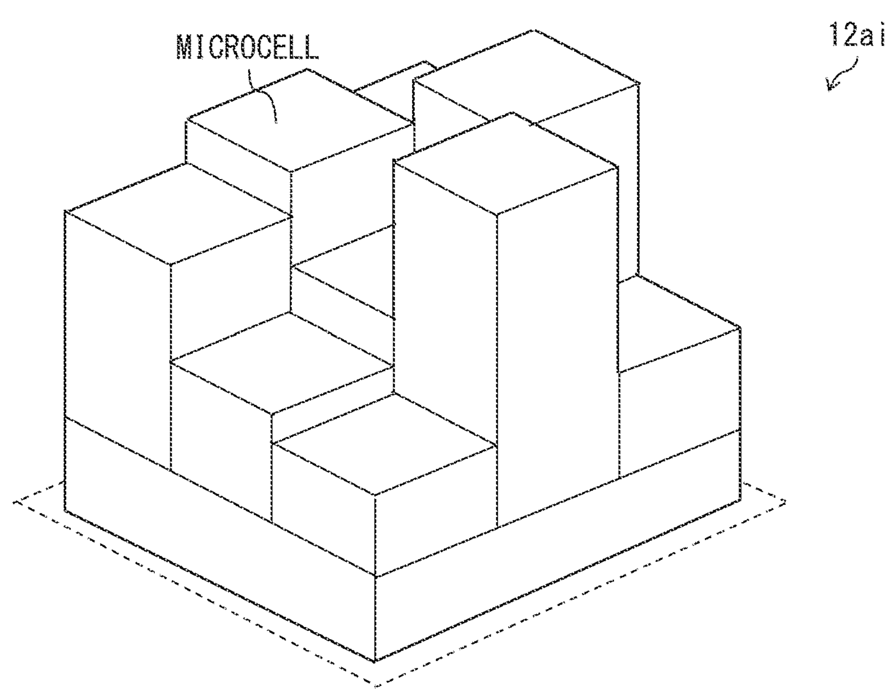
FIG. 3 is a perspective view illustrating an enlarged part of the light diffraction element illustrated in FIG. 2.

With reference to FIGS. 2 and 3, the following will describe a configuration of the light diffraction element **12*ai*. FIG. 2 is a plan view illustrating a configuration of the light diffraction element 12*ai*. FIG. 3 is a perspective view illustrating an enlarged part (part enclosed by a dotted line in FIG. 2) of the light diffraction element 12*ai***.

The light diffraction element **12*ai* is constituted by a plurality of microcells having respective thicknesses or refractive indices that are set independently of each other. When signal light enters the light diffraction element 12*ai***, signal light beams that have been diffracted in the respective microcells and that have different phases interfere with each other, so that predetermined optical computing (conversion of a two-dimensional intensity distribution in accordance with a predetermined conversion rule) is performed. Note that, in the present specification, the term "microcell" refers to, for example, a cell having a cell size of less than 10 μm. Further, in the present specification, the term "cell size" refers to a square root of an area of a cell. For example, in a case where a microcell has a square shape in plan view, the cell size is a length of one side of the cell. The cell size has a lower limit that is, for example, 1 nm.

The light diffraction element **12*ai* illustrated in FIG. 2 is constituted by 200×200 microcells arranged in a matrix pattern. Each of the microcells has a square shape having a size of 500 nm×500 nm in plan view, and the light diffraction element 12*ai*** has a square shape having a size of 100 μm×100 μm in plan view.

A phase-shift amount of light that passes through a microcell can be set independently for each of the cells by (1) setting a thickness of the microcell independently for each of the cells or (2) setting a refractive index of the microcell independently for each of the cells. One or more embodiments employ the method (1), which can be performed through nanoimprinting. In this case, as illustrated in FIG. 3, each of the microcells is constituted by a pillar that has a quadrangular prism shape and that has a square bottom surface which has sides each having a length equal to a cell size. In this case, a phase-shift amount of light that passes through a microcell is determined in accordance with a height of the pillar. That is, the light that passes through the microcell which is constituted by a high pillar has a large phase-shift amount, and the light that passes through the microcell which is constituted by a low pillar has a small phase-shift amount.

Note that the thickness or refractive index of each of the microcells can be set, for example, through machine learning. A model used in this machine learning can be, for example, a model in which a two-dimensional intensity distribution of signal light inputted into the light diffraction element **12*ai* is an input, and a two-dimensional intensity distribution of signal light outputted from the light diffraction element 12*ai* is an output and which includes a thickness or refractive index of each of the microcells as a parameter. Here, the two-dimensional intensity distribution of the signal light inputted into the light diffraction element 12*ai* means a set of intensities of signal light beams inputted into the respective microcells that constitute the light diffraction element 12*ai*. Further, the two-dimensional intensity distribution of the signal light outputted from the light diffraction element 12***ai* means: a set of intensities of signal light beams inputted into respective microcells that constitute a light diffraction element 12*ai*+1 arranged so as to follow the light diffraction element 12*ai*; or a set of intensities of signal light beams inputted into respective microcells that constitute the light receiving section 13 arranged so as to follow the light diffraction element 12*ai*.

Variation of Optical Computing Device

Figure 4:
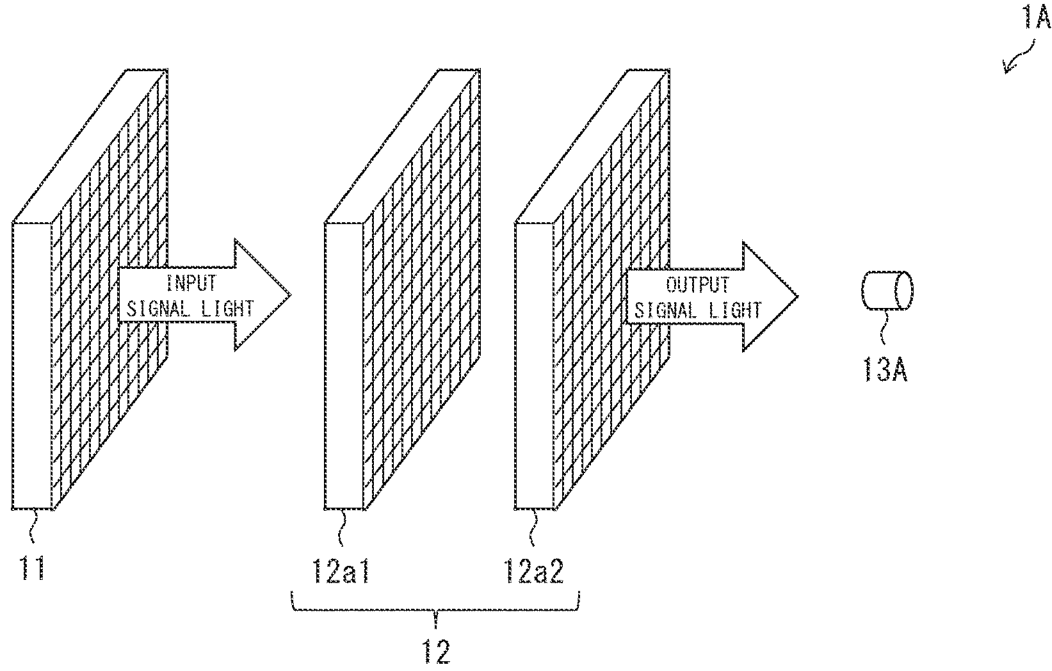
FIG. 4 is a perspective view illustrating a variation of the optical computing device illustrated in FIG. 1.

With reference to FIG. 4, the following will describe a variation (hereinafter, referred to as optical computing device 1A) of the optical computing device 1. FIG. 4 is a perspective view illustrating a configuration of the optical computing device 1A.

As illustrated in FIG. 4, the optical computing device 1A includes a light emitting section 11, a light diffraction element group 12, and a light receiving section 13A. The light emitting section 11 and the light diffraction element group 12 which are included in the optical computing device 1A illustrated in FIG. 4 are configured respectively in the same manner as the light emitting section 11 and the light diffraction element group 12 which are included in the optical computing device 1 illustrated in FIG. 1. However, the light receiving section 13 included in the optical computing device 1 illustrated in FIG. 1 is configured to individually detect respective two-dimensional intensity distributions of wavelength components contained in output signal light, whereas the light receiving section 13A included in the optical computing device 1A illustrated in FIG. 4 is configured to individually detect respective intensities of wavelength components contained in output signal light at a specific point.

In the present variation, a computation result can be provided, for example, by specifying which wavelength component the light receiving section 13 has detected, among wavelength components contained in output signal light. In order to achieve such a computing method, for example, each light diffraction element 12*ai* included in the light diffraction element group 12 need only be designed such that a wavelength component which corresponds to a computation result enters the light receiving section 13A, while a wavelength component which does not correspond to the computation result does not enter the light receiving section 13A. In addition, a computing section configured to specify, on the basis of the output signal from the light receiving section 13A, which wavelength component the light receiving section 13 has detected, among wavelength components contained in output signal light need only be added to constituent elements of the optical computing device 1.

According to the present variation, it is possible to simplify the configuration of the light receiving section 13A, resulting in decrease in manufacturing cost of the optical computing device 1A.

Aspects of one or more embodiments can also be expressed as follows:

An optical computing device according to Aspect 1 of one or more embodiments includes: a light diffraction element group including at least one light diffraction element having an optical computing function; and a light receiving section configured to individually detect respective intensities of a plurality of wavelength components contained in signal light outputted from the light diffraction element group.

According to the above configuration, it is possible to achieve an optical computing device which can use, for optical computing, a plurality of wavelength components contained in signal light.

An optical computing device according to Aspect 2 of one or more embodiments employs, in addition to the configuration of Aspect 1, a configuration such that the light receiving section is configured to individually detect respective two-dimensional intensity distributions of the plurality of wavelength components contained in the signal light outputted from the light diffraction element group.

According to the above configuration, it is possible to more effectively utilize information indicated by each of a plurality of wavelength components contained in signal light outputted from a light diffraction element group.

An optical computing device according to Aspect 3 of one or more embodiments employs, in addition to the configuration of Aspect 2, a configuration such that the optical computing device further includes a light emitting section configured to generate signal light that is to be inputted into the light diffraction element group and that contains a plurality of wavelength components having the same two-dimensional intensity distribution.

According to the above configuration, it is possible to provide a more accurate or more detailed computation result by effectively utilizing information indicated by each of a plurality of wavelength components contained in signal light outputted from the light diffraction element group.

An optical computing device according to Aspect 4 of one or more embodiments employs, in addition to the configuration of Aspect 2, a configuration such that the optical computing device further includes a light emitting section configured to generate signal light that is to be inputted into the light diffraction element group and that contains a plurality of wavelength components having different two-dimensional intensity distributions.

According to the above configuration, it is possible to provide a greater variety of computation results by effectively utilizing information indicated by each of a plurality of wavelength components contained in signal light outputted from the light diffraction element group.

An optical computing device according to Aspect 5 of one or more embodiments employs, in addition to the configuration of any one of Aspects 2 to 4, a configuration such that the light receiving section is a multispectral camera.

According to the above configuration, it is possible to provide a greater variety of computation results by effectively utilizing information indicated by each of ten or more wavelength components contained in signal light outputted from the light diffraction element group.

An optical computing device according to Aspect 6 of one or more embodiments employs, in addition to the configuration of Aspect 1, a configuration such that the light receiving section is configured to individually detect, at a specific point, respective intensities of a plurality of wavelength components contained in signal light outputted from the light diffraction element group.

According to the above configuration, it is possible to simplify the light receiving section, resulting in decrease in manufacturing cost of the optical computing device.

An optical computing device according to Aspect 7 of one or more embodiments employs, in addition to the configuration of Aspect 6, a configuration such that the optical computing device further includes a computing section configured to specify, on a basis of an output signal from the light receiving section, which wavelength component the light receiving section has detected, among wavelength components contained in the signal light outputted from the light diffraction element group.

According to the above configuration, it is possible to achieve a novel optical computing device, that is, an optical computing device configured to specify a computation result in accordance with the wavelength component which has been detected by the light receiving section.

An optical computing device according to Aspect 8 of one or more embodiments employs, in addition to the configuration of any one of Aspects 1 to 7, a configuration such that the light diffraction element is constituted by a plurality of microcells having respective thicknesses or refractive indices that are set independently of each other.

According to the above configuration, it is possible to easily manufacture a light diffraction element with use of, for example, nanoimprinting technique.

An optical computing method according to Aspect 9 of one or more embodiments is an optical computing method that uses a light diffraction element group including at least one light diffraction element having an optical computing function, the method including the step of: individually detecting respective intensities of a plurality of wavelength components contained in signal light outputted from the light diffraction element group.

According to the above configuration, it is possible to achieve an optical computing method that can use, for optical computing, a plurality of wavelength components contained in signal light.

Additional Remarks

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Optical computing device
11 Light emitting section
12 Light diffraction element group
**12*a*1, 12*a*2** Light diffraction element
13 Light receiving section

The invention claimed is:

1. An optical computing device comprising:

a light emitter that generates signal light that contains wavelength components, each wavelength component having a two-dimensional intensity distribution;

a light diffraction element group including light diffraction elements each having an optical computing function, wherein the light emitter is configured to input the signal light into the light diffraction element group; and a light receiver that detects the respective two-dimensional intensity distributions of the wavelength components contained in the signal light outputted from the light diffraction element group, wherein the light diffraction elements are disposed side by side on a light path of the signal light inputted into the light diffraction element group such that the signal light passes sequentially through the light diffraction elements, and the respective two-dimensional intensity distributions are computing variables such that the light receiver detects converted results of the optical computing function.

2. The optical computing device according to claim 1, wherein the light emitter generates the signal light such that the wavelength components have the same two-dimensional intensity distribution.

3. The optical computing device according to claim 1, wherein the light emitter generates the signal light such that the wavelength components have different two-dimensional intensity distributions.

4. The optical computing device according to claim 1, wherein the light receiver includes a multispectral camera.

5. The optical computing device according to claim 1, wherein each of the light diffraction elements is constituted by microcells having respective thicknesses or refractive indices that are set independently of each other.

6. An optical computing method comprising:

generating signal light that contains wavelength components, each wavelength contribution having a two-dimensional intensity distribution;

causing the signal light to pass sequentially through a light diffraction element group including light diffraction elements each having an optical computing function; and detecting the respective two-dimensional intensity distributions of the wavelength components contained in the signal light outputted from the light diffraction element group, wherein the light diffraction elements are disposed side by side on a light path of the signal light, and the optical computing method uses the light diffraction element group, and the respective two-dimensional intensity distributions are computing variables such that the detecting is detecting converted results of the optical computing function.

* * * * *